(12) United States Patent
Roddy et al.

(10) Patent No.: US 7,381,263 B2
(45) Date of Patent: Jun. 3, 2008

(54) CEMENT COMPOSITIONS COMPRISING HIGH ALUMINA CEMENT AND CEMENT KILN DUST

(75) Inventors: Craig W. Roddy, Duncan, OK (US); Jiten Chatterji, Duncan, OK (US); D. Chad Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 144 days.

(21) Appl. No.: 11/256,824

(22) Filed: Oct. 24, 2005

(65) Prior Publication Data

US 2007/0089643 A1    Apr. 26, 2007

(51) Int. Cl.
    *C04B 7/32* (2006.01)
(52) U.S. Cl. .................. 106/692; 106/694; 106/695; 106/707; 106/716; 106/717
(58) Field of Classification Search ................ 106/692, 106/694, 695, 707, 716, 717
    See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Williams |
| 2,871,133 A | 1/1959 | Palonen et al. |
| 2,945,769 A | 7/1960 | Gama et al. |
| 3,168,139 A | 2/1965 | Kennedy |
| 3,454,095 A | 7/1969 | Messenger et al. |
| 3,499,491 A | 3/1970 | Wyant |
| 3,557,876 A | 1/1971 | Tragesser |
| 3,748,159 A | 7/1973 | George |
| 3,876,005 A | 4/1975 | Fincher |
| 3,887,009 A | 6/1975 | Miller |
| 3,887,385 A | 6/1975 | Quist et al. |
| 4,018,617 A | 4/1977 | Nicholson |
| 4,031,184 A | 6/1977 | McCord |
| 4,176,720 A | 12/1979 | Wilson |
| 4,268,316 A | 5/1981 | Wills, Jr. |
| 4,341,562 A | 7/1982 | Ahlbeck |
| RE31,190 E | 3/1983 | Detroit et al. |
| 4,407,677 A | 10/1983 | Wills, Jr. |
| 4,432,800 A | 2/1984 | Kneller et al. |
| 4,435,216 A | 3/1984 | Diehl et al. |
| 4,460,292 A | 7/1984 | Durham |
| 4,494,990 A | 1/1985 | Harris |
| 4,515,635 A | 5/1985 | Rao et al. |
| 4,519,452 A | 5/1985 | Tsao |
| 4,555,269 A | 11/1985 | Rao et al. |
| 4,614,599 A | 9/1986 | Walker |
| 4,624,711 A | 11/1986 | Styron |
| 4,676,317 A | 6/1987 | Fry et al. |
| 4,741,782 A | 5/1988 | Styron |
| 4,784,223 A | 11/1988 | Worrall et al. |
| 4,883,125 A | 11/1989 | Wilson |
| 4,941,536 A | 7/1990 | Brothers et al. |
| 4,992,102 A | 2/1991 | Barbour et al. |
| 5,030,366 A | 7/1991 | Wilson et al. .............. 507/228 |
| 5,049,288 A | 9/1991 | Brothers et al. |
| 5,058,679 A | 10/1991 | Hale |
| RE33,747 E | 11/1991 | Hartley et al. |
| 5,086,850 A | 2/1992 | Harris et al. |
| 5,121,795 A | 6/1992 | Ewert et al. |
| 5,123,487 A | 6/1992 | Harris et al. |
| 5,125,455 A | 6/1992 | Harris et al. |
| 5,127,473 A | 7/1992 | Harris et al. |
| 5,183,505 A | 2/1993 | Spinney |
| 5,213,160 A | 5/1993 | Nahm |
| 5,238,064 A | 8/1993 | Dahl et al. |
| 5,266,111 A | 11/1993 | Barbour et al. |
| 5,295,543 A | 3/1994 | Terry et al. |
| 5,305,831 A | 4/1994 | Nahm |
| 5,314,022 A | 5/1994 | Cowan et al. |
| 5,327,968 A | 7/1994 | Onan et al. |
| 5,337,824 A | 8/1994 | Cowan |
| 5,352,288 A | 10/1994 | Mallow |
| 5,358,044 A | 10/1994 | Hale et al. |

(Continued)

FOREIGN PATENT DOCUMENTS

| | | |
|---|---|---|
| CA | 2153372 | 9/1996 |

(Continued)

OTHER PUBLICATIONS

Halliburton brochure entitled "Halad®-23 Fluid-Loss Additive" dated 2000.

(Continued)

*Primary Examiner*—Paul Marcantoni
(74) *Attorney, Agent, or Firm*—Craig W. Roddy; Baker Botts, LLP.

(57) ABSTRACT

The present invention provides cement compositions that comprise water, high alumina cement, a soluble phosphate, and cement kiln dust. The cement compositions optionally may be foamed with a gas. Methods of cementing also are provided that comprise: providing the cement composition; introducing the cement composition into a location to be cemented; and allowing the cement composition to set therein. The location to be cemented may be above ground or in a subterranean formation.

22 Claims, No Drawings

U.S. PATENT DOCUMENTS

| | | | |
|---|---|---|---|
| 5,358,049 A | 10/1994 | Hale | |
| 5,361,841 A | 11/1994 | Hale | |
| 5,361,842 A | 11/1994 | Hale | |
| 5,368,103 A | 11/1994 | Heathman et al. | |
| 5,370,185 A | 12/1994 | Cowan | |
| 5,372,641 A | 12/1994 | Carpenter | |
| 5,382,290 A | 1/1995 | Nahm et al. | |
| 5,383,521 A | 1/1995 | Onan et al. | |
| 5,383,967 A | 1/1995 | Chase | |
| 5,398,758 A | 3/1995 | Onan | |
| 5,423,379 A | 6/1995 | Hale | |
| 5,439,056 A | 8/1995 | Cowan | |
| 5,458,195 A | 10/1995 | Totten et al. | |
| 5,464,060 A | 11/1995 | Hale | |
| 5,472,051 A | 12/1995 | Brothers | |
| 5,476,144 A | 12/1995 | Nahm | |
| 5,494,513 A | 2/1996 | Fu et al. | |
| 5,499,677 A | 3/1996 | Cowan | |
| 5,515,921 A | 5/1996 | Cowan | |
| 5,518,996 A | 5/1996 | Maroy et al. | |
| 5,520,730 A | 5/1996 | Barbour et al. | |
| 5,529,624 A | 6/1996 | Riegler | |
| 5,536,311 A | 7/1996 | Rodrigues | |
| 5,542,782 A | 8/1996 | Carter | |
| 5,569,324 A | 10/1996 | Totten et al. | |
| 5,580,379 A | 12/1996 | Cowan | |
| 5,585,333 A | 12/1996 | Dahl et al. | |
| 5,588,489 A | 12/1996 | Chatterji et al. | |
| 5,673,753 A | 10/1997 | Hale | |
| 5,711,383 A | 1/1998 | Terry et al. | |
| 5,716,910 A | 2/1998 | Totten et al. | |
| 5,728,654 A | 3/1998 | Dobson, Jr. | |
| 5,851,960 A | 12/1998 | Totten et al. | |
| 5,866,516 A | 2/1999 | Costin | |
| 5,874,387 A | 2/1999 | Carpenter et al. | |
| 5,897,699 A | 4/1999 | Chatterji et al. | |
| 5,900,053 A | 5/1999 | Brothers et al. | |
| 5,913,364 A | 6/1999 | Sweatman | |
| 5,988,279 A | 11/1999 | Udarbe | |
| 6,022,408 A | 2/2000 | Stokes | |
| 6,060,434 A | 5/2000 | Sweatman et al. | |
| 6,060,535 A | 5/2000 | Villar et al. | |
| 6,063,738 A | 5/2000 | Chatterji et al. | |
| 6,138,759 A | 10/2000 | Chatterji et al. | |
| 6,143,069 A | 11/2000 | Brothers et al. | |
| 6,145,591 A | 11/2000 | Boncan et al. | |
| 6,153,562 A | 11/2000 | Villar et al. | |
| 6,167,967 B1 | 1/2001 | Sweatman | |
| 6,170,575 B1 | 1/2001 | Reddy et al. | |
| 6,230,804 B1 | 5/2001 | Mueller et al. | |
| 6,244,343 B1 | 6/2001 | Brothers et al. | |
| 6,245,142 B1 | 6/2001 | Reddy et al. | |
| 6,258,757 B1 | 7/2001 | Sweatman et al. | |
| 6,277,189 B1 | 8/2001 | Chugh | 106/705 |
| 6,312,515 B1 | 11/2001 | Barlet-Gouedard et al. | |
| 6,315,042 B1 | 11/2001 | Griffith et al. | |
| 6,332,921 B1 | 12/2001 | Brothers et al. | |
| 6,367,550 B1 | 4/2002 | Chatterji et al. | |
| 6,379,456 B1 | 4/2002 | Heathman et al. | |
| 6,402,833 B1 | 6/2002 | O'Hearn | |
| 6,409,819 B1 | 6/2002 | Ko | |
| 6,457,524 B1 | 10/2002 | Roddy | |
| 6,478,869 B2 | 11/2002 | Reddy et al. | |
| 6,488,763 B2 | 12/2002 | Brothers et al. | |
| 6,494,951 B1 | 12/2002 | Reddy et al. | |
| 6,500,252 B1 | 12/2002 | Chatterji et al. | |
| 6,508,305 B1 | 1/2003 | Brannon et al. | |
| 6,524,384 B2 | 2/2003 | Griffith et al. | |
| 6,547,871 B2 | 4/2003 | Chatterji et al. | |
| 6,561,273 B2 | 5/2003 | Brothers et al. | |
| 6,562,122 B2 | 5/2003 | Dao et al. | |
| 6,565,647 B1 | 5/2003 | Day et al. | |
| 6,572,697 B2 | 6/2003 | Gleeson | |
| 6,610,139 B2 | 8/2003 | Reddy et al. | |
| 6,626,243 B1 | 9/2003 | Boncan | |
| 6,645,290 B1 | 11/2003 | Barbour | |
| 6,656,265 B1 | 12/2003 | Garnier et al. | |
| 6,660,080 B2 | 12/2003 | Reddy et al. | |
| 6,666,268 B2 | 12/2003 | Griffith et al. | |
| 6,668,929 B2 | 12/2003 | Griffith et al. | |
| 6,689,208 B1 | 2/2004 | Brothers | |
| 6,702,044 B2 | 3/2004 | Reddy et al. | |
| 6,706,108 B2 | 3/2004 | Polston | |
| 6,716,282 B2 | 4/2004 | Griffith et al. | |
| 6,729,405 B2 | 5/2004 | DiLullo et al. | |
| 6,767,398 B2 | 7/2004 | Trato | |
| 6,776,237 B2 | 8/2004 | Dao et al. | |
| 6,796,378 B2 | 9/2004 | Reddy et al. | |
| 6,797,054 B2 | 9/2004 | Chatterji et al. | |
| 6,823,940 B2 | 11/2004 | Reddy et al. | |
| 6,835,243 B2 | 12/2004 | Brothers et al. | |
| 6,837,316 B2 | 1/2005 | Reddy et al. | |
| 6,846,357 B2 | 1/2005 | Reddy et al. | |
| 6,848,519 B2 | 2/2005 | Reddy et al. | |
| 6,887,833 B2 | 5/2005 | Brothers et al. | |
| 6,889,767 B2 | 5/2005 | Reddy et al. | |
| 6,904,971 B2 | 6/2005 | Brothers et al. | |
| 6,908,508 B2 | 6/2005 | Brothers | |
| 6,911,078 B2 | 6/2005 | Barlet-Gouedard et al. | |
| 7,048,053 B2 | 5/2006 | Santra | |
| 7,077,203 B1 | 7/2006 | Roddy et al. | |
| 7,174,962 B1 | 2/2007 | Roddy | |
| 7,199,086 B1 | 4/2007 | Roddy | |
| 7,204,307 B2 | 4/2007 | Roddy | |
| 7,204,310 B1 | 4/2007 | Roddy | |
| 7,213,646 B2 | 5/2007 | Roddy | |
| 7,284,609 B2 | 10/2007 | Roddy et al. | 166/291 |
| 2002/0033121 A1 | 3/2002 | Marko | |
| 2002/0073897 A1 | 6/2002 | Trato | 106/638 |
| 2002/0117090 A1 | 8/2002 | Ku | |
| 2003/0116065 A1 | 6/2003 | Griffith et al. | |
| 2003/0116887 A1 | 6/2003 | Scott | |
| 2003/0167970 A1 | 9/2003 | Polston | |
| 2004/0007162 A1 | 1/2004 | Morioka et al. | |
| 2004/0040475 A1 | 3/2004 | Roij | |
| 2004/0079260 A1 | 4/2004 | Datta et al. | |
| 2004/0107877 A1 | 6/2004 | Getzlaf et al. | |
| 2004/0108113 A1 | 6/2004 | Luke et al. | |
| 2004/0112600 A1 | 6/2004 | Luke et al. | |
| 2004/0187740 A1 | 9/2004 | Timmons | |
| 2004/0188091 A1 | 9/2004 | Luke et al. | |
| 2004/0188092 A1 | 9/2004 | Santra et al. | |
| 2004/0191439 A1 | 9/2004 | Bour et al. | |
| 2004/0211562 A1 | 10/2004 | Brothers et al. | |
| 2004/0211564 A1 | 10/2004 | Brothers et al. | |
| 2004/0244650 A1 | 12/2004 | Brothers | |
| 2004/0244977 A1 | 12/2004 | Luke et al. | |
| 2004/0256102 A1 | 12/2004 | Trato | |
| 2005/0000734 A1 | 1/2005 | Getzlaf et al. | |
| 2005/0034867 A1 | 2/2005 | Griffith et al. | |
| 2005/0056191 A1 | 3/2005 | Brothers et al. | |
| 2005/0072599 A1 | 4/2005 | Luke et al. | |
| 2005/0084334 A1 | 4/2005 | Shi | |
| 2005/0098317 A1 | 5/2005 | Reddy et al. | |
| 2005/0133221 A1 | 6/2005 | Chatterji et al. | |
| 2006/0025312 A1 | 2/2006 | Santra et al. | |
| 2006/0162926 A1 | 7/2006 | Roddy | 166/278 |
| 2006/0166834 A1 | 7/2006 | Roddy | 527/140 |
| 2006/0260512 A1 | 11/2006 | Nordmeyer | |
| 2007/0056474 A1 | 3/2007 | Roddy | |
| 2007/0056475 A1 | 3/2007 | Roddy | |
| 2007/0056476 A1 | 3/2007 | Roddy | |
| 2007/0056479 A1 | 3/2007 | Gray | |
| 2007/0056733 A1 | 3/2007 | Roddy | |

| | | |
|---|---|---|
| 2007/0056734 A1 | 3/2007 | Roddy |
| 2007/0089643 A1 | 4/2007 | Roddy |
| 2007/0089880 A1 | 4/2007 | Roddy |
| 2007/0102157 A1 | 5/2007 | Roddy |
| 2007/0238621 A1 | 10/2007 | Roddy et al. ............... 507/140 |

FOREIGN PATENT DOCUMENTS

| | | |
|---|---|---|
| EP | 0814067 | 12/1997 |
| EP | 1236701 | 9/2002 |
| EP | 1 348 831 | 10/2003 |
| EP | 1394137 | 3/2004 |
| GB | 1469954 | 4/1977 |
| JP | 52117316 A | 1/1977 |
| JP | 10110487 | 4/1998 |
| SU | 1373781 | 2/1988 |
| WO | WO 83/01443 | 4/1983 |
| WO | WO 98/54108 | 12/1998 |
| WO | WO 00/63134 | 10/2000 |
| WO | WO 03/031364 | 4/2003 |
| WO | WO 03/031364 A1 | 4/2003 |
| WO | WO 2005/047212 | 5/2005 |
| WO | WO 2005/061846 | 7/2005 |

OTHER PUBLICATIONS

Halliburton brochure entitled "Halad®-344 Fluid Loss Additive" dated 1998.
Halliburton brochure entitled "Halad®-413 Fluid-Loss Additive" dated 1998.
Halliburton brochure entitled "HR®-4 Cement Retarder" dated 1999.
Halliburton brochure entitled "HR®-5 Cement Additive" dated 1998.
Halliburton brochure entitled "HR®-7 Cement Retarder" dated 1999.
Halliburton brochure entitled HR®-12 Cement Retarder dated 1999.
Halliburton brochure entitled HR®-15 Cement Retarder dated 1999.
Halliburton brochure entitled "HR®-25 Cement Retarder" dated 1999.
Halliburton brochure entitled "SCR-100 Cement Retarder" dated 1999.
Halliburton brochure entitled "SCR-100 Cement Retarder—A Valuable Time Saver" dated 1994.
Halliburton brochure entitled "SCR-500L™ High-Temperature Retarder" dated 2000.
Halliburton brochure entitled "ACF-2 Foaming Agent" dated 1999.
Halliburton brochure entitled "Howco-Suds Surfactant" dated 1999.
Halliburton brochure entitled "Halad® 413 Fluid-Loss Additive" dated 1999.
Halliburton brochure entitled "Pozmix® A Cement Additive" dated 1999.
Halliburton brochure entitled "Pozmix Cement & Pozmix 140" undated.
University of Maine, "Beneficial Use of Solid Waste in Maine" printed from the internet Apr. 14, 2005.
Smith, Dwight K., "Cementing" dated 1980, p. 38.
Parsons, R.L. et al., "Use of Cement Kiln Dust for the Stabilization of Soils" printed from the internet on Apr. 14, 2005.
Paper entitled "Kiln Dusts" printed from the internet on Apr. 14, 2005.
Paper entitled "Standards for the Management of Cement Kiln Dust Waste" printed from the internet Apr. 14, 2005.
Sersale, R. et al., "Portland-Zeolite-Cement For Minimizing Alkali-Aggregate Expansion" dated 1987.
Marfil,S.A. et al., "Zeolite Crystallization in Portland Cement Concrete Due to Alkali-Aggregate Reaction" dated 1993.
Janotka, I., "The Properties of Mortar Using Blends With Portland Cement Clinker, Zeolite Tuff and Gypsum" dated 1995.
Atkins, M. et al., "Zeolite P In Cements" Its Potential For Immobilizing Toxic and Radioactive Waste Species dated 1995.

Rogers, B.A. et al., "Designing a Remedial Acid Treatment for Gulf of Mexico Deepwater Turbidite Sands Containing Zeolite Cement" dated 1998.
Janotka, I. et al., "Effect of Bentonite and Zeolite on Durability of Cement Suspension under Sulfate Attack" dated 1998.
Naiqian, Feng et al., "Study on the suppression effect of natural zeolite on expansion of concrete due to alkali-aggregate reaction" dated 1998.
Chan, Sammy et al., "Comparative study of the initial surface absorption and chloride diffusion of high performance zeolite, silicia fume and PFA concretes" dated 1999.
Ding, Jian-Tong et al., "Extreme vertices design of concrete with combined mineral admixtures" dated 1999.
Poon, C.S. et al., "A study on the hydration of natural zeolite blended cement pastes" dated 1999.
Feng, N.-Q et al., "Zeolite ceramiste cellular concrete" dated 2000.
Bartlet-Gouedard, V. et al., "A Non-Conventional Way of Developing Cement Slurry for Geothermal Wells" dated 2001.
Halliburton brochure entitled "ThermaLock™ Cement for Corrosive CO2 Environments" dated 1999.
Sugama, T. et al., "Carbonation of hydrothermally Treated Phosphate-Bonded Calcium Aluminate Cements" pp. 1-9.
Sugama T., et al. "Hot Alkali Carbonation of Sodium Metaphosphate Modified Fly Ash/Calcium Aluminate Blend Hydrothermal Cements" dated Sep. 11, 1996, pp. 1661-1672.
Roddy, Craig et al., "Methods of Using Settable Compositions Comprising Cement Kiln Dust" filed Sep. 9, 2005, as U.S. Appl. No. 11/223,671.
Roddy, Craig et al., "Methods of Using Foamed Settable Compositions Comprising Cement Kiln Dust" filed Sep. 9, 2005, as U.S. Appl. No. 11/223,485.
Roddy, Craig et al., "Foamed Settable Compositions Comprising Cement Kiln Dust" filed Sep. 9, 2005 as U.S. Appl. No. 11/223,703.
Roddy, Craig et al., "Methods of Using Settable Compositions Comprising Cement Kiln Dust and Additive(s)" filed Sep. 9, 2005, as U.S. Appl. No. 11/223,750.
Roddy, Craig et al., "Settable Compositions Comprising Cement Kiln Dust and Additive(s)" filed Sep. 9, 2005, as U.S. Appl. No. 11/223,669.
Roddy, Craig et al., entitled "Methods of Using Cement Compositions Comprising High Alumina Cement and Cement Kiln Dust" filed Oct. 24, 2005, as U.S. Appl. No. 11/257,261.
Office action from U.S. Appl. No. 11/223,671, dated Dec. 15, 2005.
Office action from U.S. Appl. No. 11/271,431, dated Mar. 6, 2006.
Smith, Dwight, "Cementing" Society of Petroleum Engineers, 1987, pp. 14, 38.
Roddy, C. et al., "Methods of Using Settable Compositions Comprising Cement Kiln Dust" U.S. Appl. No. 11/271,690, filed Nov. 10, 2005.
Roddy, C. et al., "Settable Spotting Compositions Comprising Cement Kiln Dust" U.S. Appl. No. 11/271,431, filed Nov. 10, 2005.
Office action from U.S. Appl. No. 11/223,671 dated Mar. 31, 2006.
Roddy, C. et al., "Methods of Using Lightweight Settable Compositions Comprising Cement Kiln Dust" U.S. Appl. No. 11/416,563, filed May 3, 2006.
Roddy, C. et al., "Lightweight Settable Compositions Comprising Cement Kiln Dust" U.S. Appl. No. 11/416,754, filed May 3, 2006.
Office action from U.S. Appl. No. 11/271,431 dated May 17, 2006.
Roddy, C. et al., "Methods of Using Settable Compositions Comprising Cement Kiln Dust" U.S. Appl. No. 11/440,627, filed May 25, 2006.
Herndon, J. et al., "Setting Downhole Plugs: A State-of-the-Art" Petroleum Engineer International, Apr. 1978.
txi® Material Safety Data Sheet for PRESSUR-SEAL.
Roddy, C. et al., "Cementing Compositions Comprising Cement Kiln Dust, Vitrified Shale, Zeolite, And/Or Amorphous Silica Utilzing . . . " U.S. Appl. No. 11/484,951, filed Jul. 12, 2006.
Office action dated Jul. 11, 2006 from U.S. Appl. No. 11/271,431.
Office action dated Jul. 21, 2006 from U.S. Appl. No. 11/416,563.
Office action dated Jul. 24, 2006 from U.S. Appl. No. 11/403,032.
Office action dated Aug. 15, 2006 from U.S. Appl. No. 11/271,431.
Office action dated Aug. 21, 2006 from U.S. Appl. No. 11/440,627.
Office action dated Oct. 19, 2006 from U.S. Appl. No. 11/402,741.

Foreign communication from a related counterpart application dated Oct. 27, 2006.
LaFarge North America Material Safety Data Sheet entitled "Cement Kiln Dust" dated Mar. 3, 2005.
LaFarge brochure entitled "TerraCem198 "dated Aug. 2006.
LaFarge North America Material Safety Data Sheet entitled LaFarge Blended Cement (cement) dated Mar. 3, 2005.
Foreign communication from a related counterpart application dated Nov. 2, 2006.
Foreign communication related to a counterpart application dated Dec. 1, 2006.
Foreign communication related to a counterpart application dated Dec. 19, 2006.
Office action dated Jan. 17, 2007 from U.S. Appl. No. 11/223,703.
Office action dated Feb. 2, 2007 from U.S. Appl. No. 11/402,741.
Office Action from U.S. Appl. No. 11/223,669, Jan. 29, 2008.
U.S. Appl. No. 12/034,886, filed Feb. 21, 2008, Roddy et al.
Notice of Allowance from U.S. Appl. No. 11/223,703, Feb. 27, 2008.
U.S. Appl. No. 11/402,741.
Search Report dated May 8, 2007.
Search Report dated Jul. 5, 2006.
Search Report dated Sep. 9, 2005.
Office Action dated Feb. 28, 2007 from U.S. Appl. No. 11/223,485.
Office Action dated Feb. 28, 2007 from U.S. Appl. No. 11/223,669.
Office Action dated Jun. 18, 2007 from U.S. Appl. No. 11/223,669.
Office Action dated Mar. 13, 2007 from U.S. Appl. No. 11/271,690.
Office Action dated Mar. 22, 2007 from U.S. Appl. No. 11/402,741.
Office Action dated May 29, 2007 from U.S. Appl. No. 11/402,741.
Office Action dated Apr. 25, 2007 from U.S. Appl. No. 11/223,703.
Office action dated Dec. 21, 2006 from U.S. Appl. No. 11/484,951.
Office Action dated Oct. 26, 2006 from U.S. Appl. No. 11/484,951.
Notice of Allowance dated Jul. 2, 2007 from U.S. Appl. No. 11/416,754.
Manufacture of supplementary cementitious materials from cement kiln dust, Mishulovich et al., World Cement 91996), 27(3), p. 116-120. Abstract only.
Answer 3 of 5 Chemical Abstracts on STN "Alkali-activated binders by use of industrial by-products", Cement and Concrete Research (2005), 35(5), p. 968-973 Buchwald et al. abstract only.
Answer 3 of 24 Chemical Abstracts on STN "Effect of cement kiln dust substitution on chemical and physical properties and compressive strength of Portland and slag cements", Abd El-aleem et al. (2005), abstract only.
Answer 13 of 24 Chemical Abstracts on STN "Manufacture of ceramic particles from floatstone and fly ash", CN 1182062 (abstract only).
3M Scotchlite, Glass Bubbles Floated Product Series Product Information Brochure dated 1999.
Office Action mailed Aug. 10, 2007, from U.S. Appl. No. 11/257,261.
Notice of Allowance mailed Aug. 3, 2007, from U.S. Appl. No. 11/223,485.
Notice of Allowance dated Aug. 13, 2007 from U.S. Appl. No. 11/271,690.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Final Office Action from U.S. Appl. No. 11/402,741, Oct. 24, 2007.
Notice of Allowance from U.S. Appl. No. 11/257,261, Oct. 23, 2007.
Notice of Allowance from U.S. Appl. No. 11/223,750, Dec. 13, 2007.
Notice of Allowance from U.S. Appl. No. 11/402,741, Dec. 15, 2007.

CEMENT COMPOSITIONS COMPRISING HIGH ALUMINA CEMENT AND CEMENT KILN DUST

BACKGROUND

The present invention relates to cementing operations and, more particularly, to cement compositions comprising high alumina cement, a soluble phosphate, and cement kiln dust ("CKD"), and associated methods of use.

Cement compositions may be used in a variety of subterranean applications. An example of a subterranean application that utilizes cement compositions is primary cementing whereby pipe strings, such as casing and liners, are cemented in well bores. In performing primary cementing, a cement composition may be pumped into an annular space between the walls of a well bore and the exterior surface of the pipe string disposed therein. The cement composition sets in the annular space, thereby forming therein an annular sheath of hardened cement (i.e., a cement sheath) that supports and positions the pipe string in the well bore and bonds the exterior surface of the pipe string to the walls of the well bore. Cement compositions also may be used in remedial cementing operations, for example, to seal cracks or holes in pipe strings, to seal highly permeable zones or fractures in subterranean formations, and the like. Cement compositions also may be used in surface applications, for example, construction cementing.

Cement compositions used heretofore in subterranean applications commonly comprise Portland cement. Drawbacks may exist to using Portland cements in certain applications, however, because they are prone to corrosive attacks by carbonic acid. Other hydraulic cements also may be prone to corrosive attacks by carbonic acid. Carbonic acid may be naturally present in a subterranean formation, or it may be produced in the formation by the reaction of water and carbon dioxide when the latter is introduced into the formation, for example, during a carbon dioxide enhanced recovery operation. Carbonic acid is believed to react with calcium hydroxide that is produced by hydration of Portland cement potentially causing the deterioration of the set cement. This may be problematic, for example, because it may increase the permeability of the set cement. In some instances, the degradation of the set cement may cause loss of support for the casing and undesirable interzonal communication of fluids.

The susceptibility of some hydraulic cements (e.g., Portland cement), to degradation by carbonic acid may be especially problematic in high temperature wells (e.g., geothermal wells). The term "high temperature," as used herein, refers to wells having a static bottom hole temperature above about 200° F. Because the high static well bore temperatures involved often coupled with brines containing carbon dioxide, these hydraulic cements may rapidly deteriorate. In geothermal wells, which typically involve high temperatures, pressures, and carbon dioxide concentrations, set cement failures have occurred in less then five years causing the collapse of well casing.

It has heretofore been discovered that cement compositions comprising water, high alumina cement, and a soluble phosphate set to form a cement that exhibits improved carbon dioxide resistance when cured in hydrothermal environments as compared to previously used cement compositions comprising Portland cement. As used herein, the term "high alumina cement" refers to cement having an alumina concentration in the range of from about 40% to about 80% by weight of the high alumina cement. The high alumina cement generally is a major component of the cost for these cement compositions. To reduce the cost of such cements compositions, other components may be included in the cement composition in addition to, or in place of, the high alumina cement. Such components may include fly ash, shale, metakaolin, micro-fine cement, and the like. "Fly ash," as that term is used herein, refers to the residue from the combustion of powdered or ground coal, wherein the fly ash carried by the flue gases may be recovered, for example, by electrostatic precipitation.

During the manufacture of cement, a waste material commonly referred to as "CKD" is generated. "CKD," as that term is used herein, refers to a partially calcined kiln feed which is removed from the gas stream and collected in a dust collector during the manufacture of cement. Usually, large quantities of CKD are collected in the production of cement that are commonly disposed of as waste. Disposal of the waste CKD can add undesirable costs to the manufacture of the cement, as well as the environmental concerns and costs associated with its disposal. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and $K_2O$.

SUMMARY

The present invention relates to cementing operations and, more particularly, to cement compositions comprising high alumina cement, a soluble phosphate, and CKD, and associated methods of use.

In one embodiment, the present invention provides a cement composition that comprises water, a high alumina cement, a soluble phosphate, and CKD.

Another embodiment of the present invention provides a cement composition that comprises water, calcium aluminate, sodium polyphosphate, and CKD.

Another embodiment of the present invention provides a foamed cement composition that comprises water, a high alumina cement, a soluble phosphate, CKD, a gas, and a surfactant.

The features and advantages of the present invention will be apparent to those skilled in the art. While numerous changes may be made by those skilled in the art, such changes are within the spirit of the invention.

DESCRIPTION OF PREFERRED EMBODIMENTS

The present invention relates to cementing operations and, more particularly, to cement compositions comprising high alumina cement, a soluble phosphate, and CKD, and associated methods of use. While the cement compositions of the present invention may be useful in a variety of subterranean and surface applications, they may be particularly useful in primary and remedial cement operations. Furthermore, in certain embodiments, it is believed that the cement compositions of the present invention also may be useful applications where resistance to carbon dioxide is desired, for example, in high temperature wells (e.g., geothermal wells).

A cement composition of the present invention generally comprises water, a high alumina cement, a soluble phosphate, and CKD. In some embodiments, a cement composition of the present invention may be foamed, for example, comprising water, a high alumina cement, a soluble phosphate, CKD, a gas, and a surfactant. A foamed cement composition may be used, for example, where it is desired for the cement composition to be lightweight. Other optional additives also may be included in the cement compositions of the present invention as desired, including, but not limited to, hydraulic cement, fly ash, shale, metakaolin, combinations thereof, and the like.

The cement compositions of the present invention should have a density suitable for a particular application as desired by those of ordinary skill in the art, with the benefit of this disclosure. In some embodiments, the cement compositions of the present invention may have a density in the range of from about 8 pounds per gallon ("ppg")to about 16 ppg. In the foamed embodiments, the foamed cement compositions of the present invention may have a density in the range of from about 8 ppg to about 13 ppg.

The water used in the cement compositions of the present invention may include freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may adversely affect other components in the cement composition. In some embodiments, the water may be included in an amount sufficient to form a pumpable slurry. In some embodiments, the water may be included in the cement compositions of the present invention in an amount in the range of from about 40% to about 200% by weight. As used herein, the term "by weight," when used herein to refer to the percent of a component in the cement composition, means by weight included in the cement compositions of the present invention relative to the weight of the dry components in the cement composition. In some embodiments, the water may be included in an amount in the range of from about 40% to about 150% by weight.

The cement compositions of the present invention further comprise a high alumina cement. In some embodiments, a high alumina cement that may be suitable for use comprises a calcium aluminate. The calcium aluminate may be any calcium aluminate suitable for use as a cement. A suitable calcium aluminate is SECAR® 60 calcium aluminate, commercially available from Lonestar Lafarge Company. Suitable examples of compositions comprising high alumina cements useful in subterranean cementing applications are described in U.S. Pat. Nos. 5,900,053; 6,143,069; 6,244,343; 6,332,921; 6,488,763; 6,488,764; 6,796,378; 6,846,357; 6,835,243; and 6,904,971, the entire disclosures of which are incorporated herein by reference.

The high alumina cement may be included in the cement compositions of the present invention in an amount suitable for a particular application. In some embodiments, the high alumina cement may be present in the cement compositions of the present invention in an amount in the range of from about 20% to about 80% by weight. In some embodiments, the high alumina cement may be present in the cement compositions of the present invention in an amount in the range of from about 30% to about 70% by weight.

The cement compositions of the present invention further comprise a soluble phosphate. Among other things, it is believed that the soluble phosphate should react with the high alumina cement to form a set cement that may be resistant to carbon dioxide. For example, calcium aluminate should react with sodium polyphosphate to form a calcium phosphate cement. Any type of soluble phosphate may be included in the cement compositions of the present invention, but not limited to, vitreous sodium phosphates, sodium hexametaphosphates, sodium polyphosphates, sodium dihydrogen phosphates, sodium monohydrogen phosphates, and combinations thereof. Other soluble alkali phosphates also may be suitable for use. A suitable soluble phosphate is commercially available from Astaris LLC, St. Louis, Mo. In some embodiments, the soluble phosphate may be present in the cement compositions of the present invention in an amount in the range of from about 1% to about 20% by weight. In some embodiments, the soluble phosphate may be present in the cement compositions of the present invention in an amount in the range of from about 1% to about 10% by weight.

The cement compositions of the present invention further comprise CKD. The CKD should be included in the cement compositions in an amount sufficient to provide the desired compressive strength, density, and/or cost reduction. In some embodiments, the CKD may be present in the cement compositions of the present invention in an amount in the range of from about 5% to 80% by weight. In some embodiments, the CKD may be present in the cement compositions of the present invention in an amount in the range of from about 10% to about 50% by weight.

The cement compositions of the present invention may optionally comprise a hydraulic cement. A variety of hydraulic cements may be utilized in accordance with the present invention, including, but not limited to, those comprising calcium, aluminum, silicon, oxygen, iron, and/or sulfur, which set and harden by reaction with water. Suitable hydraulic cements include, but are not limited to, Portland cements, pozzolana cements, gypsum cements, slag cements, silica cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, *API Specification for Materials and Testing for Well Cements*, API Specification 10, Fifth Ed., Jul. 1, 1990.

Where present, the hydraulic cement generally may be included in the cement compositions in an amount sufficient to provide the desired compressive strength, density, and/or cost. In some embodiments, the hydraulic cement may be present in the cement compositions of the present invention in an amount in the range of from 1% to about 50% by weight. In some embodiments, the hydraulic cement may be present in the cement compositions of the present invention in an amount in the range of from about 5% to about 47.5% by weight.

In some embodiments, a pozzolana cement that may be suitable for use comprises fly ash. A variety of fly ashes may be suitable, including fly ash classified as Class C and Class F fly ash according to American Petroleum Institute, *API Specification for Materials and Testing for Well Cements*, API Specification 10, Fifth Ed., Jul. 1, 1990. Class C fly ash comprises both silica and lime so that, when mixed with water, it sets to form a hardened mass. Class F fly ash generally does not contain sufficient lime, so an additional source of calcium ions is required for the Class F fly ash to form a cement composition with water. In some embodiments, lime may be mixed with Class F fly ash in an amount in the range of from about 0.1% to about 25% by weight of the fly ash. In some instances, the lime may be hydrated lime. Suitable examples of fly ash include, but are not limited to, POZMIX® A cement additive, commercially available from Halliburton Energy Services, Inc., Duncan, Okla.

Where present, the fly ash generally may be included in the cement compositions in an amount sufficient to provide the desired compressive strength, density, and/or cost. In some embodiments, the fly ash may be present in the cement compositions of the present invention in an amount in the range of from about 5% to about 60% by weight. In some embodiments, the fly ash may be present in the cement compositions of the present invention in an amount in the range of from about 10% to about 50% by weight.

In certain embodiments, the cement compositions of the present invention further may comprise metakaolin. Generally, metakaolin is a white pozzolan that may be prepared by heating kaolin clay, for example, to temperatures in the range of from about 600° C. to about 800° C. In some embodiments, the metakaolin may be present in the cement compositions of the present invention in an amount in the range of from about 5% to about 50% by weight. In some embodiments, the metakaolin may be present in an amount in the range of from about 10% to about 20% by weight.

In certain embodiments, the cement compositions of the present invention further may comprise shale. Among other things, shale included in the cement compositions may react with excess lime to form a suitable cementing material, for example, calcium silicate hydrate. A variety of shales are suitable, including those comprising silicon, aluminum, calcium, and/or magnesium. An example of a suitable shale comprises vitrified shale. Suitable examples of vitrified shale include, but are not limited to, PRESSUR-SEAL® Fine LCM and PRESSUR-SEAL® Coarse LCM, which are commercially available from TXI Energy Services, Inc., Houston, Tx. Generally, the shale may have any particle size distribution as desired for a particular application. In certain embodiments, the shale may have a particle size distribution in the range of from about 37 micrometers to about 4,750 micrometers.

Where present, the shale may be included in the cement compositions of the present invention in an amount sufficient to provide the desired compressive strength, density, and/or cost. In some embodiments, the shale may be present in an amount in the range of from about 5% to about 75% by weight. In some embodiments, the shale may be present in an amount in the range of from about 10% to about 35% by weight. One of ordinary skill in the art, with the benefit of this disclosure, will recognize the appropriate amount of the shale to include for a chosen application.

In certain embodiments, the cement compositions of the present invention further may comprise a set retarding additive. As used herein, the term "set retarding additive" refers to an additive that retards the setting of the cement compositions of the present invention. Suitable set retarding additives may comprise water-soluble hydroxycarboxylic acids, synthetic retarders, lignosulfonates, and combinations thereof. In some embodiments, for example, in high temperature wells, water-soluble hydroxycarboxylic acids may be used alone or in combination with another set retarding additive. Examples of suitable water-soluble hydroxycarboxylic acids include, but are not limited to, gluconic acid, lactic acid, tartaric acid, citric acid, and combinations thereof. An example of a suitable water-soluble hydroxycarboxylic acid is HR®-25 retarder, commercially available from Halliburton Energy Services, Inc., Duncan, Okla. Examples of suitable synthetic retarders, include, but are not limited to, copolymers of 2-acrylamido-2-methylpropane sulfonic acid and acrylic acid, and copolymers of 2-acrylamido-2-methylpropane sulfonic acid and maleic anhydride. Examples of suitable synthetic retarders are SCR®-100 retarder and SCR®-500 retarder, commercially available from Halliburton Energy Services, Duncan, Okla. In some embodiments, the set retarding additive may be present in an amount in the range of from about 0.1% to about 5% by weight.

Optionally, other additional additives may be added to the cement compositions of the present invention as deemed appropriate by one skilled in the art, with the benefit of this disclosure. Examples of such additives include, but are not limited to, accelerators, weight reducing additives, heavyweight additives, lost circulation materials, fluid loss control additives, dispersants, and combinations thereof. Suitable examples of these additives include crystalline silica compounds, amorphous silica, salts, fibers, hydratable clays, microspheres, pozzolan lime, latex cement, thixotropic additives, combinations thereof and the like.

An example of a cement composition of the present invention may comprise water, a high alumina cement, a soluble phosphate, and CKD. Another example of a cement composition of the present invention may comprise water, a high alumina cement, a soluble phosphate, CKD, and an additive comprising at least one of the following group: fly ash; shale; metakaolin; and combinations thereof. As desired by one of ordinary skill in the art, with the benefit of this disclosure, the cement compositions of the present invention further may comprise any of the above-listed additives, as well any of a variety of other additives suitable for use in subterranean applications.

As mentioned previously, in certain embodiments, the cement compositions of the present invention may be foamed with a gas. In some embodiments, foamed cement compositions of the present invention may comprise water, a high alumina cement, a soluble phosphate, CKD, a gas, and a surfactant. Other suitable additives, such as those discussed previously, also may be included in the foamed cement compositions of the present invention as desired by those of ordinary skill in the art, with the benefit of this disclosure.

The gas used in the foamed cement compositions of the present invention may be any gas suitable for foaming a cement composition, including, but not limited to, air, nitrogen, or combinations thereof. Generally, the gas should be present in the foamed cement compositions of the present invention in an amount sufficient to form the desired foam. In certain embodiments, the gas may be present in the foamed cement compositions of the present invention in an amount in the range of from about 10% to about 80% by volume of the cement composition.

Where foamed, the cement compositions of the present invention further comprise a surfactant. In some embodiments, the surfactant comprises a foaming and stabilizing surfactant composition. As used herein, a "foaming and stabilizing surfactant composition" refers to a composition that comprises one or more surfactants and, among other things, may be used to facilitate the foaming of a cement composition and also may stabilize the resultant foamed cement composition formed therewith. Any suitable foaming and stabilizing surfactant composition may be used in the cement compositions of the present invention. Suitable foaming and stabilizing surfactant compositions may include, but are not limited to: mixtures of an ammonium salt of an alkyl ether sulfate, a cocoamidopropyl betaine surfactant, a cocoamidopropyl dimethylamine oxide surfactant, sodium chloride, and water; mixtures of an ammonium salt of an alkyl ether sulfate surfactant, a cocoamidopropyl hydroxysultaine surfactant, a cocoamidopropyl dimethylamine oxide surfactant, sodium chloride, and water; hydrolyzed keratin; mixtures of an ethoxylated alcohol ether sulfate surfactant, an alkyl or alkene amidopropyl betaine surfactant, and an alkyl or alkene dimethylamine oxide surfactant; aqueous solutions of an alpha-olefinic sulfonate surfactant and a betaine surfactant; and combinations thereof. In one certain embodiment, the foaming and stabilizing surfactant composition comprises a mixture of an ammonium salt of an alkyl ether sulfate, a cocoamidopropyl betaine surfactant, a cocoamidopropyl dimethylamine oxide surfactant, sodium chloride, and water. A suitable example of such a mixture is ZONESEAL® 2000 foaming additive, commercially available from Halliburton Energy Services, Inc., Duncan, Okla. Suitable foaming and stabilizing surfactant compositions are described in U.S. Pat. Nos. 6,797,054, 6,547,871, 6,367,550, 6,063,738, and 5,897,699, the entire disclosures of which are incorporated herein by reference.

Generally, the surfactant may be present in the foamed cement compositions of the present invention in an amount sufficient to provide a suitable foam. In some embodiments, the surfactant may be present in an amount in the range of from about 0.8% and about 5% by volume of the water ("bvow").

The cement compositions of the present invention may be used in a variety of subterranean applications, including, but not limited to, primary cementing and remedial cementing operations. The cement compositions of the present invention also may be used in surface applications, for example, construction cementing.

An example of a method of the present invention comprises providing a cement composition of the present invention comprising water, a high alumina cement, a soluble phosphate, and CKD; placing the cement composition in a location to be cemented; and allowing the cement composition to set therein. In some embodiments, the location to be cemented may be above ground, for example, in construction cementing. In some embodiments, the location to be cemented may be in a subterranean formation, for example, in subterranean applications. In some embodiments, the cement compositions of the present invention may be foamed. As desired by one of ordinary skill in the art, with the benefit of this disclosure, the cement compositions of the present invention useful in this method further may comprise any of the above-listed additives, as well any of a variety of other additives suitable for use in subterranean applications.

Another example of a method of the present invention is a method of cementing in a subterranean formation. An example of such a method may comprise providing a cement composition of the present invention comprising water, a high alumina cement, a soluble phosphate, and CKD; introducing the cement composition into a portion of the subterranean formation; and allowing the cement composition to set therein. In some embodiments, the portion of the subterranean formation may be a high temperature subterranean formation. In some embodiments, the portion of the subterranean formation may have a temperature in the range of from about 200° F. to about 800° F. In some embodiments, the portion of the subterranean formation may have a temperature in the range of from about 300° F. to about 800° F. In some embodiments, the cement compositions of the present invention may be foamed. As desired by one of ordinary skill in the art, with the benefit of this disclosure, the cement compositions of the present invention useful in this method further may comprise any of the above-listed additives, as well any of a variety of other additives suitable for use in subterranean application.

To facilitate a better understanding of the present invention, the following examples of certain aspects of some embodiments are given. In no way should the following examples be read to limit, or define, the scope of the invention.

EXAMPLE 1

A series of sample cement compositions were prepared at room temperature and subjected to 72-hour compressive strength tests at 190° F. in accordance with API Specification 10. Sample No. 1 was a comparative sample that did not comprise CKD.

The results of the compressive strength tests are set forth in the table below.

TABLE 1

Unfoamed Compressive Strength Tests

| Sample | Density (ppg) | SECAR® 60 calcium aluminate (by wt) | CKD Class A (by wt) | POZMIX® A Cement Additive (by wt) | Soluble Phosphate[1] (by wt) | Hydrated Lime (by wt) | HR®-25 Retarder (by wt) | Citric Acid (by wt) | 72-Hour Compressive Strength at 190° F. (psi) |
|---|---|---|---|---|---|---|---|---|---|
| No. 1 | 15.2 | 46.57 | — | 46.57 | 4.9 | — | .98 | .98 | 3,650 |
| No. 2 | 13 | 46.57 | 46.57 | — | 4.9 | — | .98 | .98 | 734 |
| No. 3 | 12.5 | 46.57 | 46.57 | — | 4.9 | — | .98 | .98 | 186.4 |
| No. 4 | 13 | 46.57 | 23.29 | 23.29 | 4.9 | — | .98 | .98 | Not Set |
| No. 5 | 12.97 | 46.57 | 19.61 | 23.29 | 4.9 | 3.67 | .98 | .98 | 158 |
| No. 6 | 14.5 | 46.57 | 46.57 | — | 4.9 | — | .98 | .98 | 919 |

[1]The soluble phosphate included in the samples comprised sodium hexametaphosphate.

EXAMPLE 2

Sample Compositions No. 7 and No. 8 were prepared at room temperature and subjected to 72-hour compressive strength tests at 190° F. in accordance with API Specification 10.

Sample Composition No. 7 was a comparative sample that did not comprise CKD. Sample Composition No. 7 comprised 46.57% by weight of SECAR® 60 calcium aluminate, 46.57% by weight of POZMIX® cement additive, 4.9% by weight of sodium hexametaphosphate, 0.9% by weight of HR®-25 retarder, 0.9% by weight of citric acid, and 2% bvow of ZONESEAL® 2000 foaming additive. Sample Composition No. 7 was foamed down to a density of about 12 ppg.

Sample Composition No. 8 comprised 46.57% by weight of SECAR® 60 calcium aluminate, 46.57% by weight of Class A CKD, 4.9% by weight of sodium hexametaphosphate, 0.9% by weight of HR®-25 retarder, 0.9% by weight of citric acid, and 2% bvow of ZONESEAL® 2000 foaming additive. Sample Composition No. 8 was foamed down to a density of about 12 ppg.

The results of the compressive strength tests are set forth in the table below.

TABLE 2

Foamed Compressive Strength Tests

| Sample | Base Density (ppg) | Foam Density (ppg) | SECAR® 60 calcium aluminate (by weight) | CKD Class A (by weight) | POZMIX® A Cement Additive (by weight) | Soluble Phosphate[1] (by weight) | 72-Hour Compressive Strength at 190° F. (psi) |
|---|---|---|---|---|---|---|---|
| No. 7 | 15.2 | 12 | 46.57 | — | 46.57 | 4.9 | 803 |
| No. 8 | 13.05 | 12 | 46.57 | 46.57 | — | 4.9 | 34.5[2] |
| No. 8 | 13.05 | 12 | 46.57 | 46.57 | — | 4.9 | 140 |

[1]The soluble phosphate included in the samples comprised sodium hexametaphosphate.
[2]It is believed that this compressive strength test was terminated early due to the inadvertent shut off of the hot water bath.

Accordingly, the above examples indicate that foamed and unfoamed cement compositions comprising water, a high alumina cement, a soluble phosphate, and CKD may provide suitable compressive strengths for a particular application.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b")disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A cement composition comprising:
   water;
   a high alumina cement;
   a soluble phosphate; and
   cement kiln dust.

2. The cement composition of claim 1 wherein the water comprises at least one fluid selected from the group consisting of: freshwater; saltwater; a brine; seawater; and combinations thereof.

3. The cement composition of claim 1 wherein the high alumina content cement comprises a calcium aluminate.

4. The cement composition of claim 1 wherein the high alumina content cement is present in the cement composition in an amount in the range of from about 20% to about 80% by weight.

5. The cement composition of claim 1 wherein the soluble phosphate comprises at least one phosphate selected from the group consisting of: a vitreous sodium phosphate; a sodium hexametaphosphate; a sodium polyphosphate; a sodium dihydrogen phosphate; a sodium monohydrogen phosphate; and combinations thereof.

6. The cement composition of claim 1 wherein the soluble phosphate is present in the cement composition in an amount in the range of from about 1% to about 20% by weight.

7. The cement composition of claim 1 wherein the cement kiln dust is present in the cement composition in an amount of about 5% to 80% by weight.

8. The cement composition of claim 1 wherein the cement composition further comprises fly ash.

9. The cement composition of claim 8 wherein the cement composition further comprises a hydrated lime.

10. The cement composition of claim 1 wherein the cement composition further comprises at least one additive selected from the group consisting of: hydraulic cement; fly ash; metakaolin; shale; and combinations thereof.

11. The cement composition of claim 1 wherein the cement composition further comprises vitrified shale.

12. The cement composition of claim 1 wherein the cement composition further comprises at least one additive selected from the group consisting of: a set retarding additive; an accelerator; a weight reducing additive; a heavyweight additive; a lost circulation material; a fluid loss control additives; a dispersant; and combinations thereof.

13. The cement composition of claim 1 wherein the cement composition further comprises at least one additive selected from the group consisting of: a crystalline silica compound; amorphous silica; a salt; a fiber; a hydratable clay; a microsphere; pozzolan lime; a latex cement; a thixotropic additive; and combinations thereof.

14. A foamed cement composition comprising:
    water;
    a high alumina cement;
    a soluble phosphate;
    cement kiln dust;
    a gas; and
    a surfactant.

15. The foamed cement composition of claim 14 wherein the high alumina content cement comprises a calcium aluminate.

16. The foamed cement composition of claim 14 wherein the soluble phosphate comprises at least one phosphate selected from the group consisting of: a vitreous sodium phosphate; a sodium hexametaphosphate; a sodium polyphosphate; a sodium dihydrogen phosphate; a sodium monohydrogen phosphate; and combinations thereof.

17. The foamed cement composition of claim 14:
wherein the high alumina content cement is present in the cement composition in an amount in the range of from about 20% to about 80% by weight;
wherein the soluble phosphate is present in the cement composition in an amount in the range of from about 1% to about 20% by weight; and
wherein the cement kiln dust is present in the cement composition in an amount of about 5% to 80% by weight.

18. The foamed cement composition of claim 14 wherein the gas comprises at least one gas selected from the group consisting of: air; nitrogen; and combinations thereof.

19. The foamed cement composition of claim 14 wherein the surfactant comprises a foaming and stabilizing surfactant composition.

20. The foamed cement composition of claim 14 wherein the surfactant comprises at least one surfactant selected from the group consisting of: a mixture of an ammonium salt of an alkyl ether sulfate, a cocoamidopropyl betaine surfactant, a cocoamidopropyl dimethylamine oxide surfactant, sodium chloride, and water; a mixture of an ammonium salt of an alkyl ether sulfate surfactant, a cocoamidopropyl hydroxysultaine surfactant, a cocoamidopropyl dimethylamine oxide surfactant, sodium chloride, and water; a hydrolyzed keratin; a mixture of an ethoxylated alcohol ether sulfate surfactant, an alkyl or alkene amidopropyl betaine surfactant, and an alkyl or alkene dimethylamine oxide surfactant; an aqueous solution of an aipha-olefinic sulfonate surfactant and a betaine surfactant; and combinations thereof.

21. A cement composition comprising:
water;
a high alumina cement comprising a calcium aluminate;
sodium polyphosphate; and
cement kiln dust.

22. The cement composition of claim 13:
wherein the calcium aluminate is present in the cement composition in an amount in the range of from about 20% to about 80% by weight;
wherein the sodium polyphosphate is present in the cement composition in an amount in the range of from about 1% to about 20% by weight; and
wherein the cement kiln dust is present in the cement composition in an amount of about 5% to 80% by weight.

* * * * *